US010002538B2

(12) United States Patent
Palanichamy et al.

(10) Patent No.: US 10,002,538 B2
(45) Date of Patent: Jun. 19, 2018

(54) AIRCRAFT CLEARANCE ENFORCEMENT

(75) Inventors: Anbazhagan Palanichamy, Bangalore (IN); Varadharajan Ramachandran, Bangalore (IN); Balaji Srinivasan, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 2300 days.

(21) Appl. No.: 12/465,914

(22) Filed: May 14, 2009

(65) Prior Publication Data

US 2010/0292912 A1 Nov. 18, 2010

(51) Int. Cl.

*G05D 1/00* (2006.01)
*G08G 5/00* (2006.01)
*G08G 5/06* (2006.01)

(52) U.S. Cl.

CPC ......... *G08G 5/0013* (2013.01); *G08G 5/0021* (2013.01); *G08G 5/065* (2013.01); *G08G 5/006* (2013.01); *G08G 5/06* (2013.01)

(58) Field of Classification Search

CPC ...... G01C 23/00; G08G 5/0013; G08G 5/065; G08G 5/0004; G08G 5/0021; G08G 5/0026; G08G 5/0043; G08G 5/006; G08G 5/0082; G08G 5/04; G08G 5/045; G08G 5/06

USPC ...... 701/1, 120, 117, 3, 9, 10; 340/911, 917, 340/945–983

See application file for complete search history.

(56) References Cited

U.S. PATENT DOCUMENTS 6,694,249 B1 * 2/2004 Anderson et al. ............ 701/120
6,828,921 B2 12/2004 Brown et al.
7,414,545 B2 * 8/2008 Vickas .......................... 340/953
(Continued)

FOREIGN PATENT DOCUMENTS

EP 1947624 7/2008
FR 2913799 9/2008

OTHER PUBLICATIONS

European Patent Office, "European Search Report", dated Sep. 22, 2010, Published in: EP.

(Continued)

*Primary Examiner* — Michael C McCullough
*Assistant Examiner* — Kalyanavenkateshware Kumar
(74) *Attorney, Agent, or Firm* — Fogg & Powers LLC

(57) ABSTRACT

A clearance enforcement system for a vehicle includes a transceiver to communicate over a data link that communicatively couples the vehicle to a control center external to the vehicle and a management unit configured to enforce a vehicle clearance policy. The vehicle clearance policy specifies that a vehicle must receive, in response to a clearance request message, an affirmative response message from a control center external to the vehicle, before executing a movement associated with the affirmative response message. The management unit enforces the vehicle clearance policy through a computer implemented method. The computer implemented method operates to first automatically determine within the vehicle when the vehicle is initiating the movement without having received the affirmative response and automatically alerting an operator of the vehicle that is initiating the movement without having received the affirmative response message. The operator of the vehicle is typically alerted using at least one visual annunciator, audible annunciator, or tactile annunciator.

22 Claims, 12 Drawing Sheets

(56) References Cited

U.S. PATENT DOCUMENTS

| | | | | |
|---|---|---|---|---|
| 8,271,184 | B2 * | 9/2012 | Gayraud et al. | 701/120 |
| 2003/0193408 | A1 * | 10/2003 | Brown | G08G 5/0086 340/945 |
| 2007/0078591 | A1 * | 4/2007 | Meunier et al. | 701/120 |
| 2008/0042880 | A1 * | 2/2008 | Ramaiah et al. | 340/958 |
| 2008/0167885 | A1 * | 7/2008 | Judd et al. | 705/1 |

OTHER PUBLICATIONS

European Patent Office, "Communication under Rule 71(3) EPC", "from Foreign Counterpart of U.S. Appl. No. 12/465,914", dated Nov. 29, 2011, pp. 1-48, Published in: EP.
European Patent Office, "Office Action", "from Foreign Counterpart of U.S. Appl. No. 12/465,914", dated Oct. 5, 2010, pp. 1-6, Published in: EP.

* cited by examiner

AIRCRAFT CLEARANCE ENFORCEMENT

BACKGROUND

Pilots of aircraft communicate with air traffic controllers ("ATCs") through voice radio communication or through electronic messages. Some avionics systems include functionality that enables a pilot of an aircraft to request clearance from a ground ATC located at an air traffic control center by sending a clearance request message to the ATC. As used in this application, a clearance request "message" is an electronic message sent between an aircraft and an ATC control center using a data communication system. This differs from a "voice" clearance request that a pilot makes by speaking and which is communicated between an aircraft and an ATC control center using a voice communication system. The avionics system is located in the aircraft and communicates with the ATC using one or more data links that are established between the avionics system and the ATC. The data link is typically established between the aircraft avionics system and the ATC control center using very high frequency ("VHF"), high frequency ("HF"), or satellite communication ("SATCOM") radio communications using Aircraft Communications Addressing and Reporting System ("ACARS") or Aeronautical Telecommunications Network ("ATN"). The electronic messages are sent across this data link. The ATC communicates a response to the request for clearance by sending a response message to the avionics system using the data link. The response message is also an electronic message that is communicated across the data link. The ATC can send an affirmative response message when the ATC grants the request for clearance or can send a negative response message when the ATC denies or delays the request for clearance.

One or more applicable policies dictate that particular clearances must be requested and granted before an aircraft takes off, while others must be requested and granted while the aircraft is airborne and or after the aircraft has landed. Clearances that must be requested and granted before an aircraft takes off are referred to here as "pre-flight" clearances. Clearances that must be requested and granted while an aircraft is airborne are referred to here as "in-flight" clearances. Clearances that must be requested and granted after the aircraft has landed are referred to here as "post-flight" clearances. Examples of pre-flight clearances include those relating to push back, taxi, and takeoff. This list is not exhaustive and other types of pre-flight clearances exist. Examples of in-flight clearance clearances include those relating to changing altitude, maintaining altitude, changing direction or heading, maintaining direction or heading, changing speed, maintaining speed, crossing a particular waypoint position, following a particular route, proceeding to a particular position, resuming normal speed, confirming position, confirming altitude, confirming speed, and confirming next waypoint. This list is not exhaustive and other types of in-flight clearance clearances exist. Examples of post-flight clearances include those relating to taxing-in and parking at the gate. Clearance request messages and response messages are typically sent across the data link, though voice radio communication between the pilot and/or flight crew and the ATC can also be used to request and respond to clearance requests.

Scenarios occur in which a pilot and/or flight crew are distracted in the cockpit, such that they neglect to request a particular clearance from the ATC before initiating aircraft movement which, under an applicable policy, requires the clearance to be granted before the movement is initiated. For example, there have been cases reported in the Aviation Safety Reporting System ("ASRS") database where pilots have inadvertently taxied without taxi clearances and taken off without takeoff clearances, only to realize what happened after completing the taxi and takeoff respectively. Aircraft movements on the ground that are made without the appropriate clearance may lead to collisions or other accidents or lead to other adverse effects.

SUMMARY

A method of enforcing a vehicle clearance policy specifying that a vehicle must receive an affirmative response message from a control center that is external to the vehicle before executing a movement associated with the affirmative response message includes automatically determining within the vehicle when the vehicle is initiating the movement and automatically alerting an operator of the vehicle that is initiating the movement without having received the affirmative response message.

A clearance enforcement system for a vehicle includes a transceiver to communicate over a data link that communicatively couples the vehicle to a control center external to the vehicle and a management unit configured to enforce a vehicle clearance policy specifying that a vehicle must receive an affirmative response message from a control center external to the vehicle before executing a movement associated with the affirmative response message. The management unit automatically determines within the vehicle when the vehicle is initiating the movement without having received the affirmative response message. The management unit also automatically alerts the operator of the vehicle that the vehicle is initiating the movement without having received the affirmative response message. The management unit alerts the operator using at least one of an audible annunciator, a visible annunciator, or a tactile annunciator.

A program-product for enforcing a vehicle clearance policy specifying that a vehicle must receive an affirmative response message from a control center external to the vehicle before executing a movement associated with the affirmative response message, the program-product comprising a processor-readable storage medium on which program instruction are embodied. The program instructions are operable to, when executed by at least one programmable processor included in the vehicle that is configured to communicate with the control center, cause the vehicle to automatically determine within the vehicle when the vehicle is initiating the movement without having received the affirmative response message and automatically alert the operator of the vehicle that the vehicle is initiating the movement without having received the affirmative response message. The operator of the vehicle is alerted by any one of automatically visually alerting the operator, automatically audibly alerting the operator, or automatically tactilely alerting the operator.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
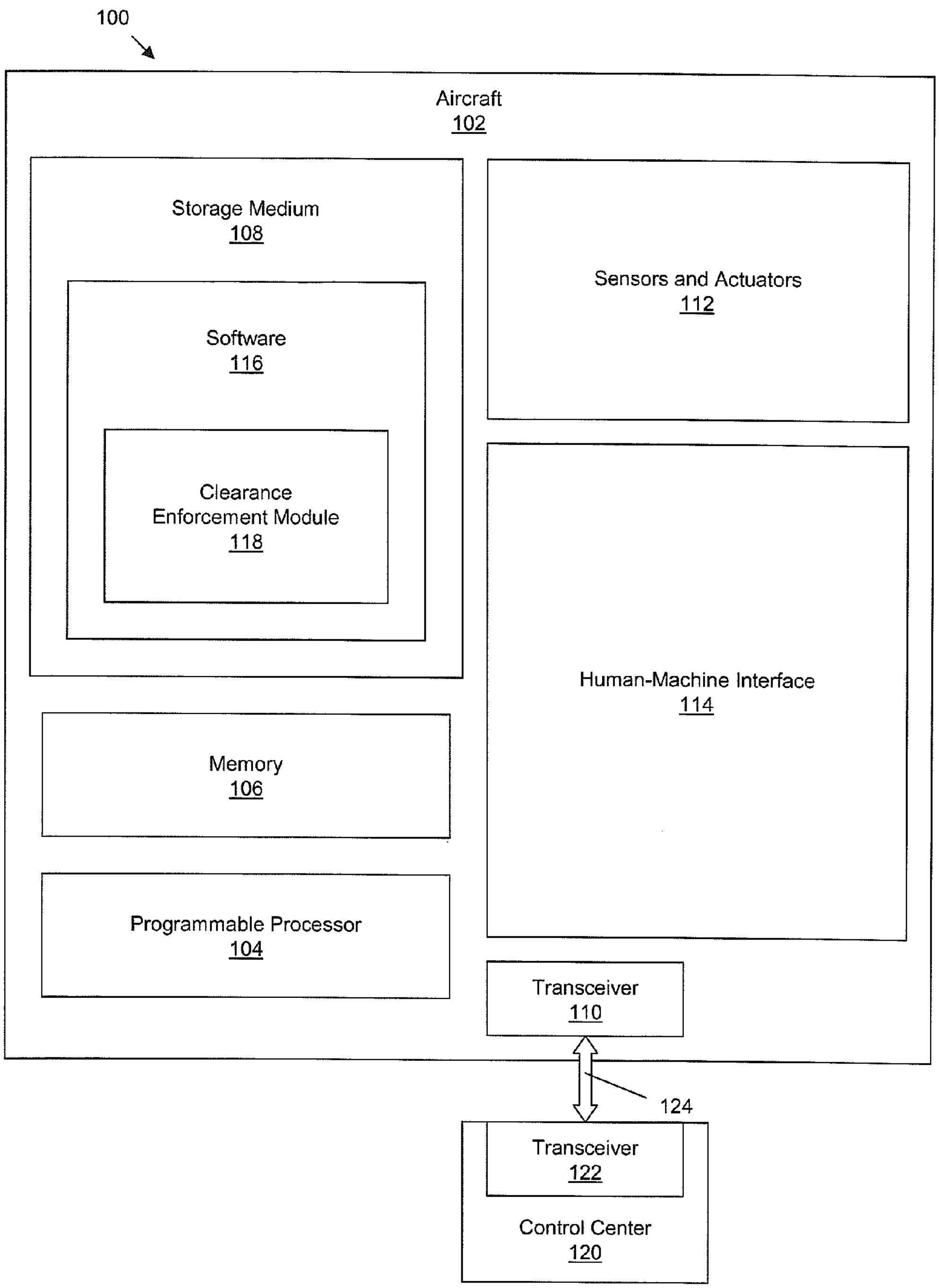
FIG. 1 is a block diagram of one embodiment of an aircraft clearance enforcement system.

FIG. 1 is a block diagram of one embodiment of an aircraft clearance enforcement system 100. System 100 is implemented in or on an aircraft 102. The system 100 includes at least one programmable processor 104, at least one memory 106, at least one storage medium 108, at least one transceiver 110, a plurality of sensors and actuators 112, and a human-machine interface 114. In example embodiments, the system 100 is implemented on other vehicles instead of the aircraft 102, such as sea vessels, spacecraft, trains, and ground vehicles.

The system 100 is described here as being implemented in part using software 116 that executes on at least one programmable processor 104 (though it is to be understood that the system 100 can be implemented using various combinations of hardware and software). In the particular embodiment shown in FIG. 1, the software 116 is executed by at least one programmable processor 104 (for example, at least one general-purpose microprocessor or central processor) included in a computer or similar device. The software 116 comprises a set of program instructions embodied on the at least one storage medium 108 from which at least a portion of the program instructions are read by the at least one programmable processor 104 for execution thereby. The program instructions, when executed by the at least one programmable processor 104, carry out at least a portion of the functionality described here as being performed by the system 100. The at least one programmable processor 104 includes and/or is coupled to the at least one memory 106 for storing such program instructions and/or data used during execution of the software 116. Examples of the at least one storage medium 108 include non-volatile memory devices such as nonvolatile RAM or FLASH memory as well as mass storage devices such as magnetic disc drives and optical disc drives. Examples of the at least one memory 106 include any suitable form of memory (such as random-access memory and registers included within the at least one programmable processor 104). Although only a single at least one storage medium 108 and at least one memory 106 are shown in FIG. 1, it is to be understood that multiple storage at least one storage medium 108 and at least one memory 106 are typically used.

In the particular embodiment shown in FIG. 1, the software 116 comprises a clearance enforcement module 118. The clearance enforcement module 118 automatically enforces a clearance policy requiring that a clearance first be granted before the aircraft 102 performs restricted movements associated with the clearance. As used in this application, "automatically" means to be performed using electronic devices without requiring human input or intervention. The operation of the clearance enforcement module will be discussed in further detail below.

The at least one transceiver 110 is configured to wirelessly communicate with a remote device. For example, as shown in FIG. 1, a control center 120 external to the aircraft 102 includes at least one transceiver 122 that is configured for two-way communication with the at least one transceiver 110 of the aircraft 102. A data link 124 is established between the at least one transceiver 110 of the aircraft 102 and the at least one transceiver 122 of the control center 120. The data link 124 is used for real-time communication between a pilot and/or flight crew stationed on the aircraft 102 and an air traffic controller ("ATC") located at the control center 120. The at least one transceiver 110 and the at least one transceiver 122 are typically very high frequency ("VHF") radio transceivers, high frequency ("HF") radio transceivers, or satellite communication ("SATCOM") radio transceivers. In some implementations of the embodiment shown in FIG. 1, the at least one transceiver 110 communicates directly with the at least one transceiver 122, while in other implementations there are intermediary devices that route and relay the messages across the data link 124 between the at least one transceiver 110 and the at least one transceiver 122.

Various clearance request messages are defined and associated with various clearances in the clearance enforcement module 118. Specifically, various clearance request messages are defined and configured for use by the pilot and/or flight crew stationed in the aircraft 102. The clearance request messages are configured to enable the pilot and/or flight crew to request various clearances from the ATC stationed at the control center 120. In addition, various response messages are defined and configured for use by the ATC stationed at the control center 120. The response messages are configured to enable the ATC to either grant or deny/delay the requested clearance requested by the pilot and/or flight crew onboard the aircraft 102. Because the ATC has the discretion to either grant or deny/delay the requested clearance by responding in an affirmative or negative manner, there are both affirmative and negative response messages available. An affirmative response indicates the clearance requested in the clearance request message is granted. A negative response indicates that the clearance requested in the clearance request message is denied. In some implementations, at least one of a specific field, a specific flag, or a specific element of the response message is used to determine whether the response message is affirmative or negative.

The plurality of sensors and actuators 112 are communicatively coupled to the at least one programmable processor 104. The plurality of sensors and actuators 112 are configured to detect either current physical movement of the aircraft 102 or indicia of imminent movement of the aircraft 102. The clearance enforcement module 118 is configured to receive input from the plurality of sensors and actuators 112 indicating whether any movement of the aircraft 102 is detected. Typically, the plurality of sensors and actuators 112 include a number of different sensors and actuators, which are discussed in further detail below.

The human-machine interface 114 is configured to display output to, and receive input from, the pilot and/or flight crew of the aircraft 102. Typically, the human-machine interface 114 includes at least one display device (for example, one or more cockpit displays or speakers located with a cockpit of the aircraft 102) and at least one input device (for example, one or more keyboards, keypads, or pointing devices located within the cockpit of the aircraft 102). Example implementations of the human-machine interface 114 are discussed in further detail below.

The aircraft 102 includes other components and systems required or advantageous for flight, such as a cockpit, fuselage, wings, tail, engines, elevators, ailerons, flaps, landing gear, seats, seat belts, flight yokes, windshields, windows, doors, etc.

Figure 2:
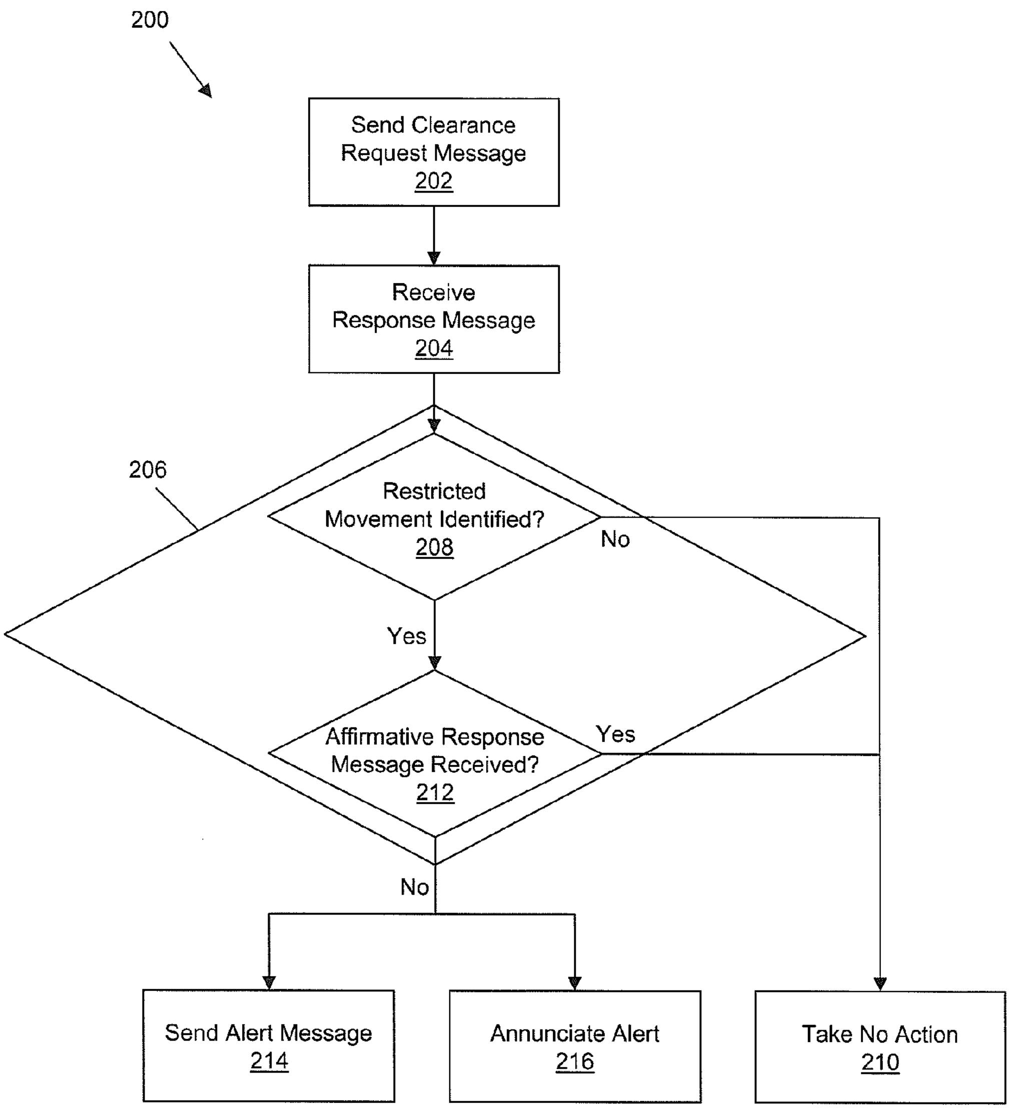
FIG. 2 is a flow diagram showing an example method of enforcing an aircraft clearance policy implemented using the system of FIG. 1.

FIG. 2 is a flow diagram showing one embodiment of a method 200 of enforcing an aircraft clearance policy. The embodiment of method 200 shown in FIG. 2 is described here as being implemented using the aircraft clearance enforcement system 100 shown in FIG. 1 (though the method 200 can be implemented in other ways). The aircraft clearance policy enforced by method 200 specifies that a movement-specific affirmative response message sent by the ATC at the air traffic control center 120 must first be received at the clearance enforcement module 118 of the aircraft 102 before the aircraft 102 is allowed to initiate movements associated with the movement specific clearance message.

The method 200 begins at block 202, where a clearance request message is sent across the data link 124 from the at least one transceiver 110 of the aircraft 102 to the at least one transceiver 122 of the control center 120. Typically, the pilot and/or flight crew input the clearance request via human-machine interface 114.

The method 200 proceeds to block 204, where a response message is received at the at least one transceiver 110 across the data link 124. Typically, the response message is sent by the ATC stationed at the control center 120. As described above, the ATC can send affirmative or negative response messages to the clearance enforcement module 118. An affirmative response message indicates that the aircraft 102 is cleared to initiate the movements associated with the request. A negative response message indicates that the aircraft 102 is not cleared to initiate the movements associated with the request.

The method 200 proceeds to block 206, where it is automatically determined when the aircraft 102 begins to initiate a particular movement without having first received an affirmative response message associated with the particular movement. Specifically, the clearance enforcement module 118 automatically determines whether the aircraft 102 is initiating any restricted movement at block 208. The clearance enforcement module automatically makes this determination after receiving current values from the plurality of sensors and actuators 112 and comparing the current values to threshold values stored on the at least one storage medium 108. The threshold values are typically predetermined based on both physical movements and indicia of imminent restricted movements of the aircraft 102. When the current values differ from the threshold values in particular ways, the clearance enforcement module 118 automatically determines that the aircraft 102 is beginning a restricted movement that requires an affirmative response message first be received. If the clearance enforcement module 118 automatically determines that the aircraft 102 is not beginning a restricted movement requiring an affirmative response message first be received, then the method 200 proceeds to block 210 where no action is taken.

If the clearance enforcement module 118 automatically determines that the aircraft 102 is initiating a restricted movement requiring an affirmative response message first be received, the method 200 proceeds to block 212. At block 212, the clearance enforcement module 118 automatically determines whether the affirmative response message, required before the aircraft 102 is allowed to perform the restricted movement, has been received from the control center 120 by the clearance enforcement module 118 via the data link 124. Specifically, the clearance enforcement module 118 automatically determines whether the affirmative response message required before the restricted movement is initiated by the aircraft 102 has been received at the clearance enforcement module 118 from the control center 120. If the clearance enforcement module 118 automatically determines that the affirmative response message required before the restricted movement is initiated by the aircraft 102 has been received at the clearance enforcement module 118 from the control center 120, then the method 200 proceeds to block 210 where no action is taken.

If the clearance enforcement module 118 automatically determines that the affirmative response message required before the restricted movement is initiated by the aircraft 102 has not been received at the clearance enforcement module 118 from the control center 120, then the method 200 proceeds to block 214 and block 216, executed in parallel. At block 214, an alert message is sent across the data link 124 from the at least one transceiver 110 of the aircraft 102 to the at least one transceiver 122 of the control center 120. This is done automatically by the clearance enforcement module 118 in response to initiation of the restricted movement of the aircraft 102 without the required response message having been first received. In some implementations, sending the alert message to the control center is mandatory, while in other implementations it is optional.

At block 216, the clearance enforcement module 118 annunciates an alert to the pilot and/or flight crew using the human-machine interface 114. Specific devices and methods of annunciation are discussed in further detail below.

Although in the example embodiment shown in FIG. 2 and described above, the method 200 includes block 202, where a clearance request message is sent across the data link 124 from the at least one transceiver 110 of the aircraft 102 to the at least one transceiver 122 of the control center 120, in other implementations the method 200 does not first require a clearance request message to be sent, but begins at block 204, where a response message is received at the at least one transceiver 110 across the data link 124.

Figure 3:
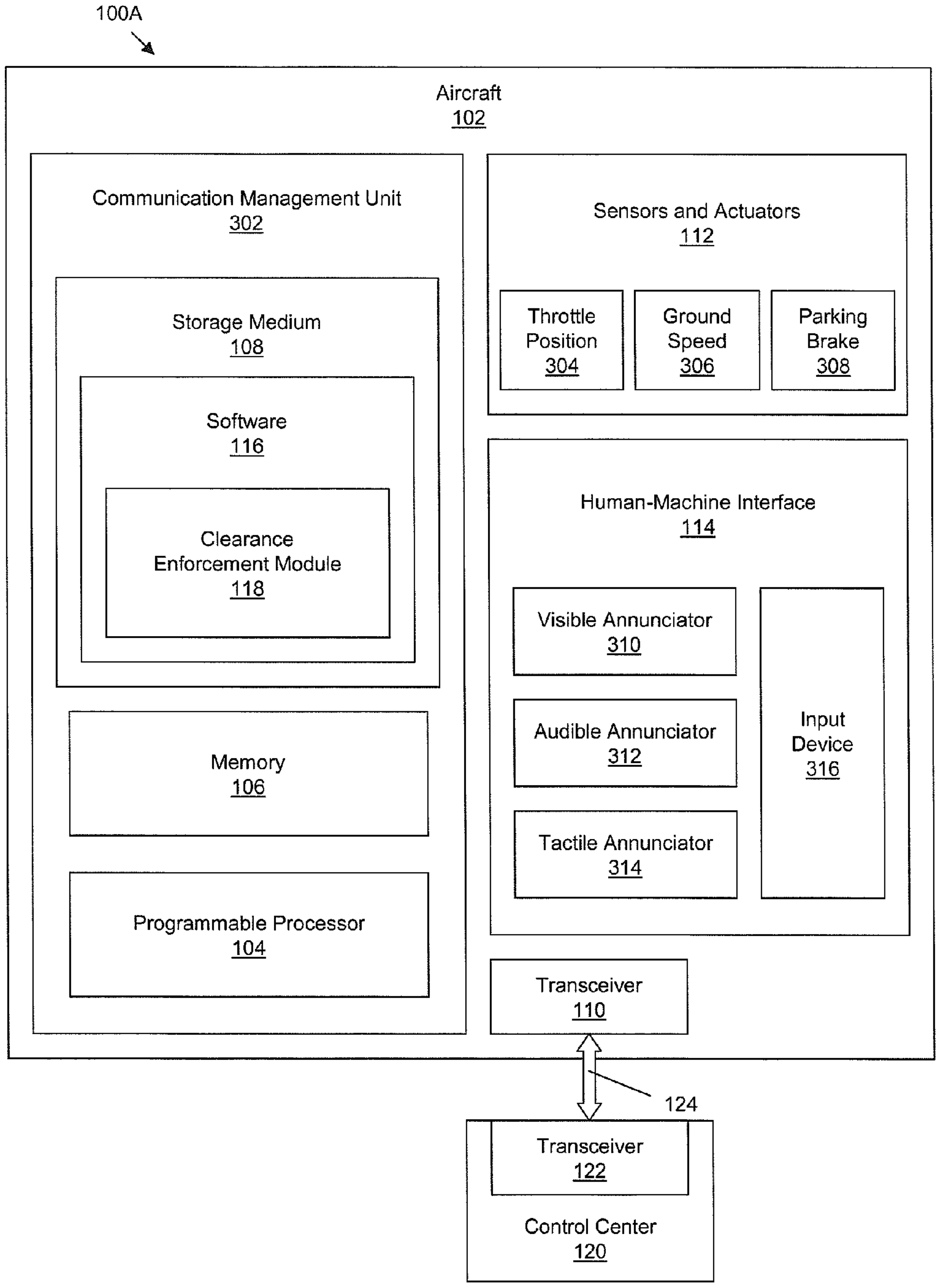
FIG. 3 is a block diagram of a specific implementation of the aircraft clearance enforcement system of FIG. 1 implemented using a communication management unit.

FIG. 3 is a block diagram of one exemplary implementation of the aircraft clearance enforcement system 100 of FIG. 1. This implementation of the system is referenced in FIG. 3 using reference numeral 100A. The system 100A uses a communication management unit ("CMU") 302. Except as described below in connection with FIG. 3, those components of system 100A that are referenced in FIG. 3 using the same reference numerals as used in FIG. 1 are the same as the corresponding components described above in connection with FIG. 1, the description of which is not repeated here.

In system 100A, the at least one programmable processor 104, the at least one memory 106, and the at least one storage medium 108 are part of the CMU 302. The CMU 302 is an avionics communication system used to route information from onboard avionics to the control center 120 via the data link 124. In exemplary implementations of the CMU 302, the CMU 302 includes software based data link application modules that interface between avionics and the pilot and/or flight crew and protocol stack modules that route data traffic through the at least one transceiver 110 and across the data link 124. These data link application modules are typically stored as software 116 on the at least one storage medium 108. In such an implementation, the clearance enforcement module 118 is implemented as one or more of the data link applications modules used by the CMU 302 that are executed by the at least one programmable processor 104 of the CMU 302. The software 116 typically includes other data link application modules and other types of application modules, configured to aid in the operation and flight of the aircraft 102.

The plurality of sensors and actuators 112 of the system 100A include sensors and actuators configured to track real time measurements relating to throttle position 304, ground speed 306, and parking brake 308. Other implementations of the system 100 include other configurations of the plurality of sensors and actuators 112.

The human-machine interface 114 of the system 100A includes at least one visible annunciator 310, at least one audible annunciator 312, at least one tactile annunciator 314, and at least one input device 316. The at least one visible annunciator 310, the at least one audible annunciator 312, and the at least one tactile annunciator 314 are configured to appraise the pilot and/or flight crew of important information regarding the aircraft 102. Specifically, the at least one visible annunciator 310 is configured to visually alert the pilot and/or flight crew of important information. The at least one visible annunciator 310 is typically a liquid crystal display ("LCD"), though other implementations use at least one light bulb, a light emitting diode ("LED"), an organic light emitting diode ("OLED"), a field emission display ("FED"), a surface-conduction electron-emitter display ("SED"), a plasma display, or other visible annunciator. In some implementations, there is a plurality of the at least one visible annunciator 310 in the system 100A. In other implementations, the system 100A does not have an at least one visible annunciator 310.

The at least one audible annunciator 312 is configured to audibly alert the pilot and/or flight crew. The at least one audible annunciator 312 is typically a speaker, though other implementations use a siren, a bell, or other audible annunciators. In some implementations, there is a plurality of the at least one audible annunciator 312 in the system 100A. In other implementations, the system 100A does not include any of the at least one audible annunciator 312.

The at least one tactile annunciator 314 is configured to tactilely alert the pilot and/or flight crew. The at least one tactile annunciator 314 is typically a vibrator coupled with and configured to vibrate the flight yoke, though other implementations use vibrators coupled with and configured to vibrate seats, flight yokes, the floor, or other tactile annunciators. In some implementations, there is a plurality of the at least one tactile annunciator 314 in the system 100A. In other implementations, the system 100A does not include any of the at least one tactile annunciator 314.

Other implementations and embodiments use other amounts and types of annunciators to alert the pilot and/or flight crew, such as annunciators discernible by taste and smell and other annunciators discernible by vision, hearing, and touch. In some examples there is a plurality of the human-machine interface 114.

The at least one input device 316 is configured to accept input from the pilot and/or flight crew. The at least one input device 316 typically includes at least one button, keyboard, keypad, knob, switch, touch screen, microphone, or other input device.

Figure 4:
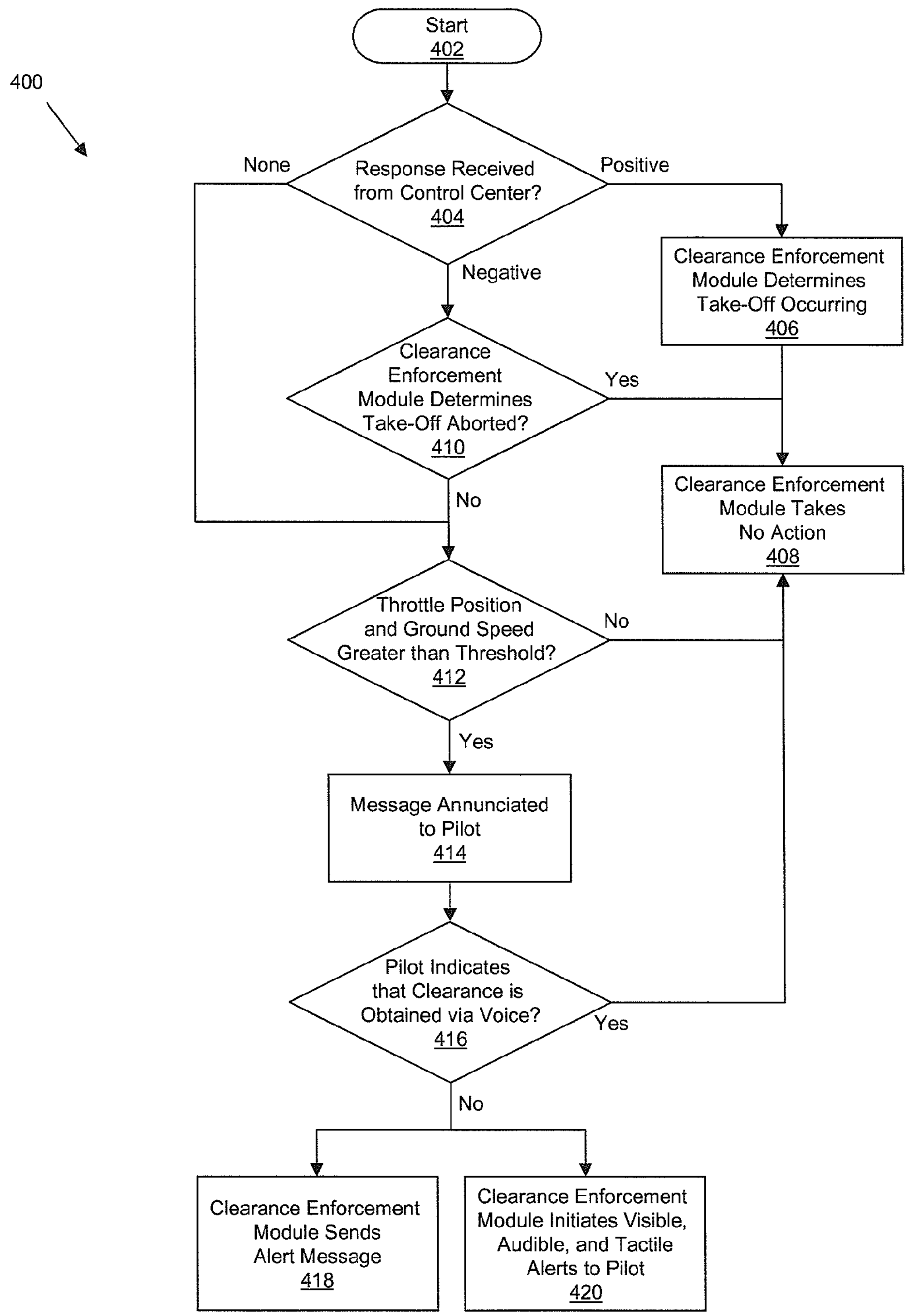
FIG. 4 is a flow chart showing one embodiment of a method of enforcing an aircraft clearance policy implemented using the system of FIG. 3.

FIGS. 4-9 are flow charts showing example embodiments of methods of enforcing the aircraft clearance policies implemented using the system 100A of FIG. 3. FIG. 4 is a flow chart showing one embodiment of a method 400 of enforcing an aircraft clearance policy. The method 400 begins at block 402 when the aircraft 102 is on the ground and ready for takeoff and the pilot initiates a departure clearance request through the at least one input device 316 of the human-machine interface 114. A departure clearance request message is sent to the control center 120 across the data link 124. The method 400 proceeds to block 404, where it is automatically determined what type of response to the departure clearance request message, if any, has been received at the clearance enforcement module 118 of the CMU 302 from the control center 120. The clearance enforcement module 118 typically receives either an affirmative response to the departure clearance request, a negative response to the departure clearance request, or no response to the departure clearance request back from the control center 120. If an affirmative response to the departure clearance request has been received at block 404, the method 400 branches to block 406, where the clearance enforcement module 118 of the CMU 302 automatically determines that a take-off is occurring. The method 400 proceeds to block 408, where the clearance enforcement module 118 of the CMU 302 takes no action and the method 400 ends.

If the clearance enforcement module 118 of the CMU 302 automatically determines at block 404, that a negative response to the departure clearance request message has been received, the method 400 branches to block 410, where the clearance enforcement module 118 of the CMU 302 automatically determines whether the takeoff has been aborted. If the clearance enforcement module 118 of the CMU 302 automatically determines that the takeoff has been aborted at block 410, the method 400 branches to block 408, where the clearance enforcement module 118 of the CMU 302 takes no action and the method 400 ends.

If the clearance enforcement module 118 of the CMU 302 automatically determines that the takeoff has not been aborted at block 410, the method 400 branches to block 412, where the clearance enforcement module 118 of the CMU 302 automatically determines whether the current throttle position 304 and the current ground speed 306 measured by the plurality of sensors and actuators 112 are greater than predetermined threshold values for throttle position and ground speed stored in the at least one storage medium 108, which indicate an imminent takeoff. The predetermined threshold values for throttle position and ground speed that indicate an imminent takeoff are defined as the lowest throttle positions and ground speeds indicative of an imminent takeoff. The predetermined threshold values that indicate an imminent takeoff are typically stored in the at least one storage medium 108. If the clearance enforcement module 118 of the CMU 302 automatically determines that the current throttle position 304 and the current ground speed 306 are not greater than the predetermined threshold values for throttle position and ground speed stored in the at least one storage medium 108, the method 400 branches to block 408, where the clearance enforcement module 118 of the CMU 302 takes no action and the method 400 ends.

If the clearance enforcement module 118 of the CMU 302 automatically determines that the current throttle position 304 and the current ground speed 306 are greater than the predetermined threshold values for throttle position and ground speed stored in the at least one storage medium 108, the method 400 branches to block 414, where the clearance enforcement module 118 of the CMU 302 annunciates a message to the pilot and/or flight crew via the human-machine interface 114. Specifically, the clearance enforcement module 118 of the CMU 302 uses the at least one visible annunciator 310, the at least one audible annunciator 312, or the at least one tactile annunciator 314 to appraise the pilot/and or flight crew of the imminent takeoff of the aircraft 102. Typically, the clearance enforcement module 118 of the CMU 302 uses more than one type of annunciator to increase the likelihood that the pilot and/or flight crew receive the annunciation.

The method 400 proceeds to block 416, where the clearance enforcement module 118 of the CMU 302 automatically determines whether the pilot and/or flight crew responded to the annunciation of block 414 indicating that the affirmative response to the departure clearance request was obtained via voice communication. The pilot and/or flight crew typically input a response to the annunciation of block 414 using the at least one input device 316 of the human-machine interface 114. If the clearance enforcement module 118 of the CMU 302 automatically determines that the pilot and/or flight crew did respond to the annunciation of block 414 indicating that the affirmative response to the departure clearance request was obtained via voice communication, then the method 400 branches to block 408 where the clearance enforcement module 118 takes no action.

If the clearance enforcement module 118 of the CMU 302 automatically determines that the pilot and/or flight crew did not respond to the annunciation of block 414 indicating that the affirmative response to the departure clearance request was obtained via voice communication, then the method 400 branches to block 418 and block 420 in parallel. At block 418, the clearance enforcement module 118 of the CMU 302 sends a message to the control center 120 via the data link 124, alerting the ATC of the imminent departure without having been granted departure clearance. At block 420, the clearance enforcement module 118 of the CMU 302 initiates visible, audible, and tactile alerts of the imminent departure without having been granted departure clearance. The alerts are provided to the pilot and/or flight crew using the at least one visible annunciator 310, the at least one audible annunciator 312, and the at least one tactile annunciator 314. Typically, the clearance enforcement module 118 initiates alerts using all three types of annunciators, but in some implementations, only one or two of the annunciator types are used. In other examples, one type of annunciator is first used, followed up with subsequent uses of other types of annunciators.

Returning to block 404, if it is automatically determined by the clearance enforcement module of the CMU 302 that no response to the departure clearance request has been received at block 404, the method 400 branches to block 412, where the clearance enforcement module 118 of the CMU 302 automatically determines whether the current throttle position 304 and the current ground speed 306 measured by the plurality of sensors and actuators 112 are greater than predetermined threshold values for throttle position and ground speed stored in the at least one storage medium 108 that indicate an imminent takeoff. As described above, the predetermined threshold values are typically stored in the at least one storage medium 108. The method 400 continues from block 412 as described above.

Figure 5:
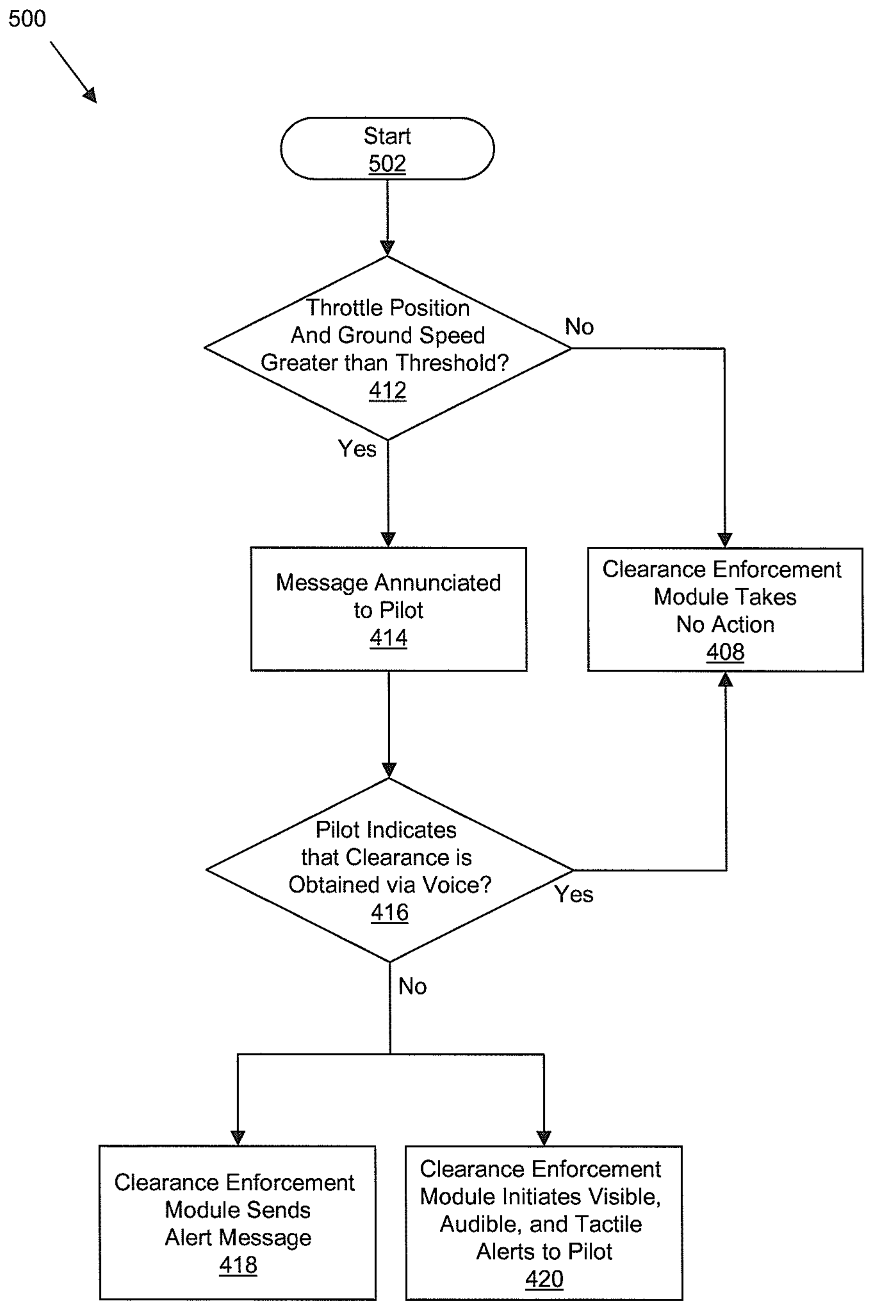
FIG. 5 is a flow chart showing another embodiment of a method of enforcing an aircraft clearance policy implemented using the system of FIG. 3.

FIG. 5 is a flow chart showing one embodiment of a method 500 of enforcing an aircraft clearance policy implemented using the system 100A of FIG. 3A. The method 500 begins at block 502 when the aircraft 102 is on the ground and ready for takeoff, the pilot forgot to request a departure clearance, and the pilot initiates takeoff. The method 500 proceeds to block 412, where it follows the same flow from block 412 of the method 400 of FIG. 4 described above.

Figure 6:
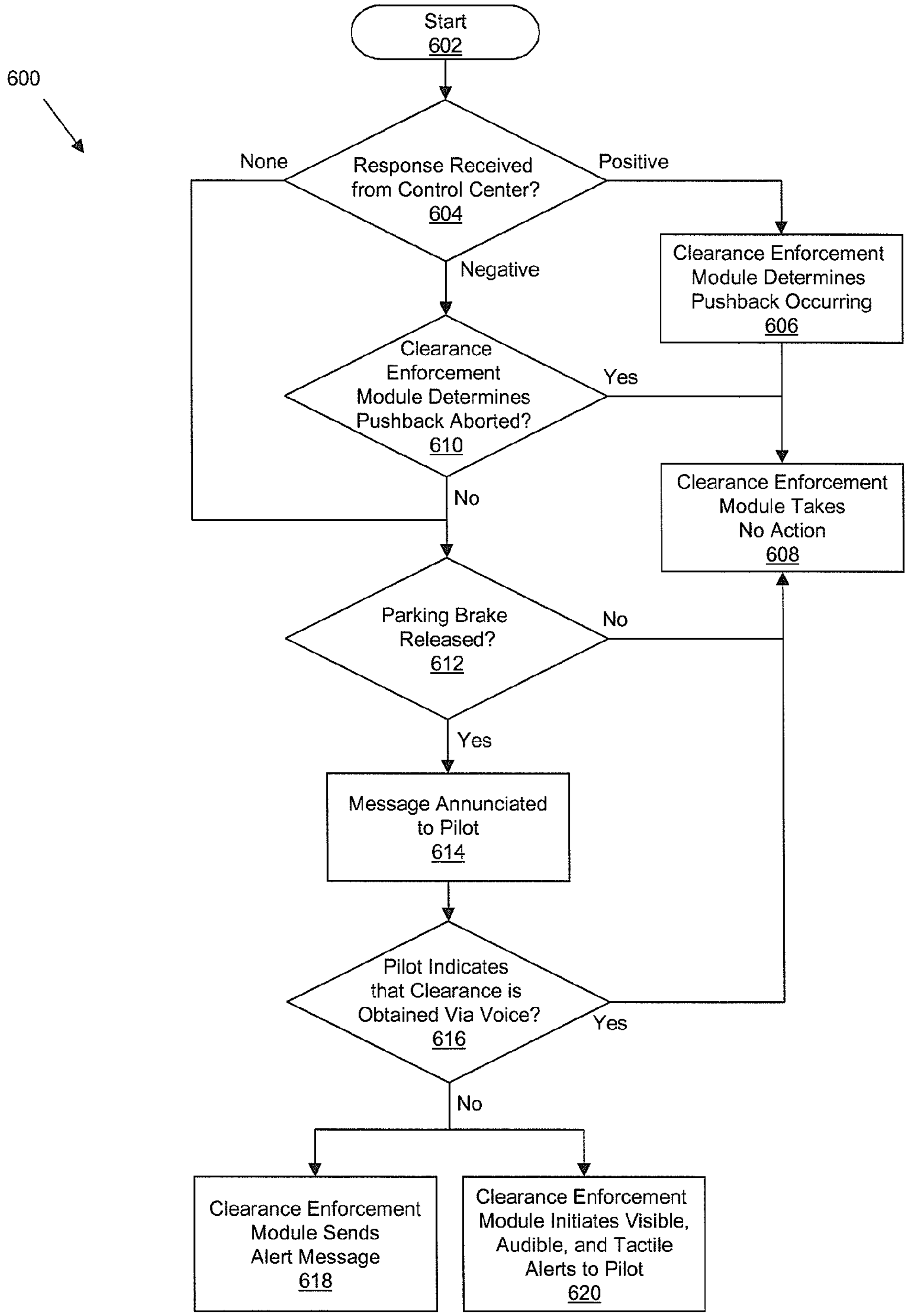
FIG. 6 is a flow chart showing another embodiment of a method of enforcing an aircraft clearance policy implemented using the system of FIG. 3.

FIG. 6 is a flow chart showing one embodiment of a method 600 of enforcing an aircraft clearance policy implemented using the system 100A of FIG. 3. The method 600 begins at block 602 when the aircraft 102 is on the ground and ready to pushback and the pilot initiates a pushback clearance request through the at least one input device 316 of the human-machine interface 114. A pushback clearance request message is sent to the control center 120 across the data link 124. The method 600 proceeds to block 604, where it is automatically determined what type of response to the pushback clearance request, if any, has been received at the clearance enforcement module 118 of the CMU 302 from the control center 120. The clearance enforcement module 118 typically receives either an affirmative response to the pushback clearance request, a negative response to the pushback clearance request, or no response to the pushback clearance request back from the control center 120. If an affirmative response to the pushback clearance request has been received at block 604, the method 600 branches to block 606, where the clearance enforcement module 118 of the CMU 302 automatically determines that a pushback is occurring. The method 600 proceeds to block 608, where the clearance enforcement module 118 of the CMU 302 takes no action and the method 600 ends.

If the clearance enforcement module 118 of the CMU 302 automatically determines, at block 604, that a negative response to the pushback clearance request message has been received, the method 600 branches to block 610, where the clearance enforcement module 118 of the CMU 302 automatically determines whether the pushback has been aborted. If the clearance enforcement module 118 of the CMU 302 automatically determines that the pushback has been aborted at block 610, the method 600 branches to block 608, where the clearance enforcement module 118 of the CMU 302 takes no action and the method 600 ends.

If the clearance enforcement module 118 of the CMU 302 automatically determines that the pushback has not been aborted at block 610, the method 600 branches to block 612, where the clearance enforcement module 118 of the CMU 302 automatically determines whether the parking brake 308 has been released as measured by the plurality of sensors and actuators 112. If the clearance enforcement module 118 of the CMU 302 automatically determines that the parking brake 308 has not been released at block 612, the method 600 branches to block 608, where the clearance enforcement module 118 of the CMU 302 takes no action and the method 600 ends.

If the clearance enforcement module 118 of the CMU 302 automatically determines that the parking brake 308 has been released at block 612, the method 600 branches to block 614, where the clearance enforcement module 118 of the CMU 302 annunciates a message to the pilot and/or flight crew via the human-machine interface 114. Specifically, the clearance enforcement module 118 of the CMU 302 uses the at least one visible annunciator 310, the at least one audible annunciator 312, or the at least one tactile annunciator 314 to appraise the pilot/and or flight crew of the imminent pushback of the aircraft 102. Typically, the clearance enforcement module 118 of the CMU 302 uses more than one type of annunciator to increase the likelihood that the pilot and/or flight crew receive the annunciation.

The method 600 proceeds to block 616, where the clearance enforcement module 118 of the CMU 302 automatically determines whether the pilot and/or flight crew responded to the annunciation of block 614 indicating that the affirmative response to the pushback clearance request was obtained via voice communication. The pilot and/or flight crew typically input a response to the annunciation of block 614 using the at least one input device 316 of the human-machine interface 114. If the clearance enforcement module 118 of the CMU 302 automatically determines that the pilot and/or flight crew did respond to the annunciation of block 614 indicating that the affirmative response to the pushback clearance request was obtained via voice communication, then the method 600 branches to block 608 where the clearance enforcement module 118 takes no action.

If the clearance enforcement module 118 of the CMU 302 automatically determines that the pilot and/or flight crew did not respond to the annunciation of block 614 indicating that the affirmative response to the pushback clearance request was obtained via voice communication, then the method 600 branches to block 618 and block 620 in parallel. At block 618, the clearance enforcement module 118 of the CMU 302 sends a message to the control center 120 via the data link 124, alerting the ATC of the imminent pushback without affirmative pushback clearance. At block 620, the clearance enforcement module 118 of the CMU 302 initiates visible, audible, and tactile alerts to the pilot and/or flight crew of the imminent pushback without affirmative pushback clearance using the at least one visible annunciator 310, the at least one audible annunciator 312, and the at least one tactile annunciator 314. Typically, the clearance enforcement module 118 initiates alerts using all three types of annunciators, but in some implementations, only one or two of the annunciator types are used. In other examples, one type of annunciator is first used, followed up with subsequent uses of other types of annunciators.

Returning to block 604, if it is automatically determined by the clearance enforcement module of the CMU 302 that no response to the pushback clearance request has been received at block 604, the method 600 branches to block 612, where the clearance enforcement module 118 of the CMU 302 automatically determines whether the parking brake 308 has been released as measured by the plurality of sensors and actuators 112. The method 600 continues from block 612 as described above.

Figure 7:
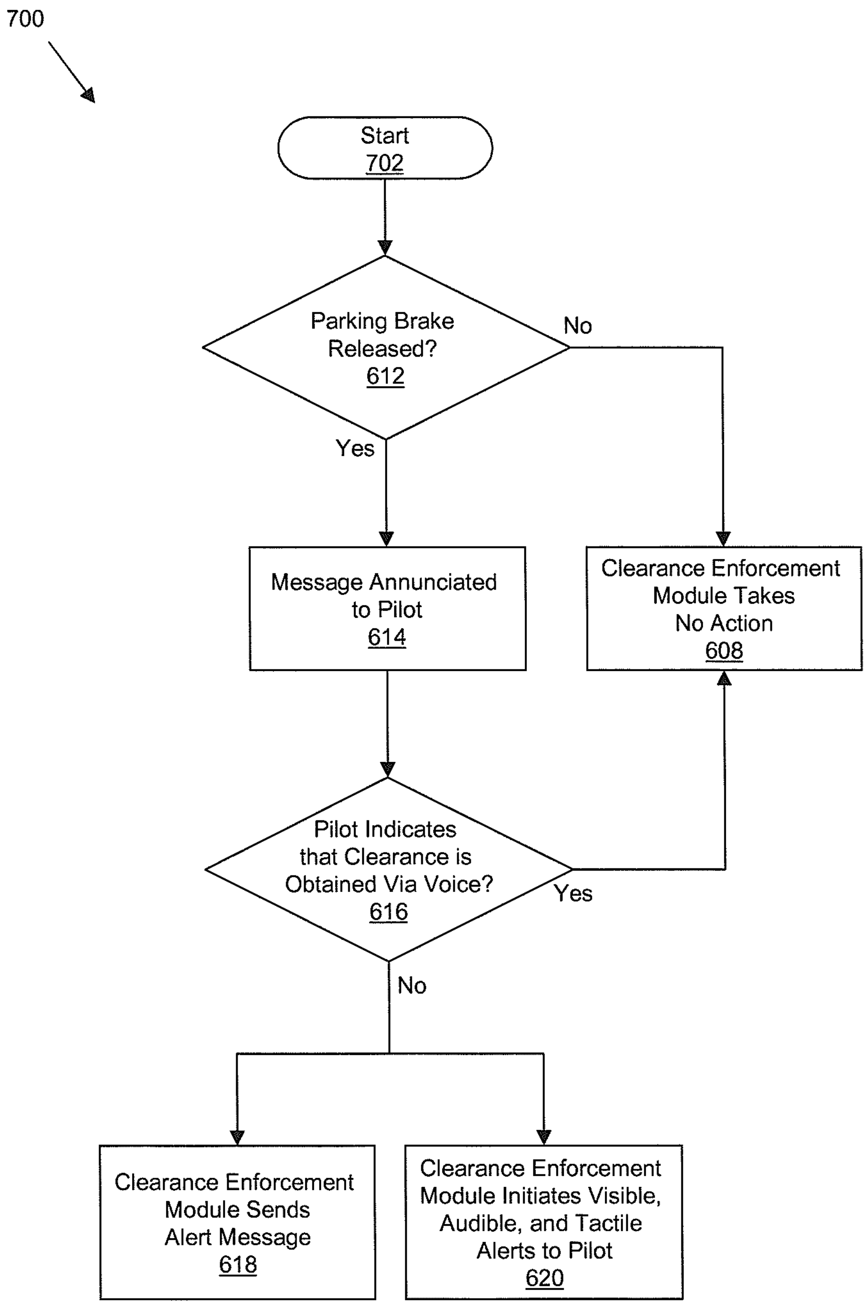
FIG. 7 is a flow chart showing another embodiment of a method of enforcing an aircraft clearance policy implemented using the system of FIG. 3.

FIG. 7 is a flow chart showing one embodiment of a method 700 of enforcing an aircraft clearance policy implemented using the system 100A of FIG. 3. The method 700 begins at block 702 when the aircraft 102 is on the ground and ready for pushback, the pilot forgot to request a pushback clearance, and the pilot initiates pushback. The method 700 proceeds to block 612, where it follows the same flow from block 612 of the method 600 of FIG. 6 described above.

Figure 8:
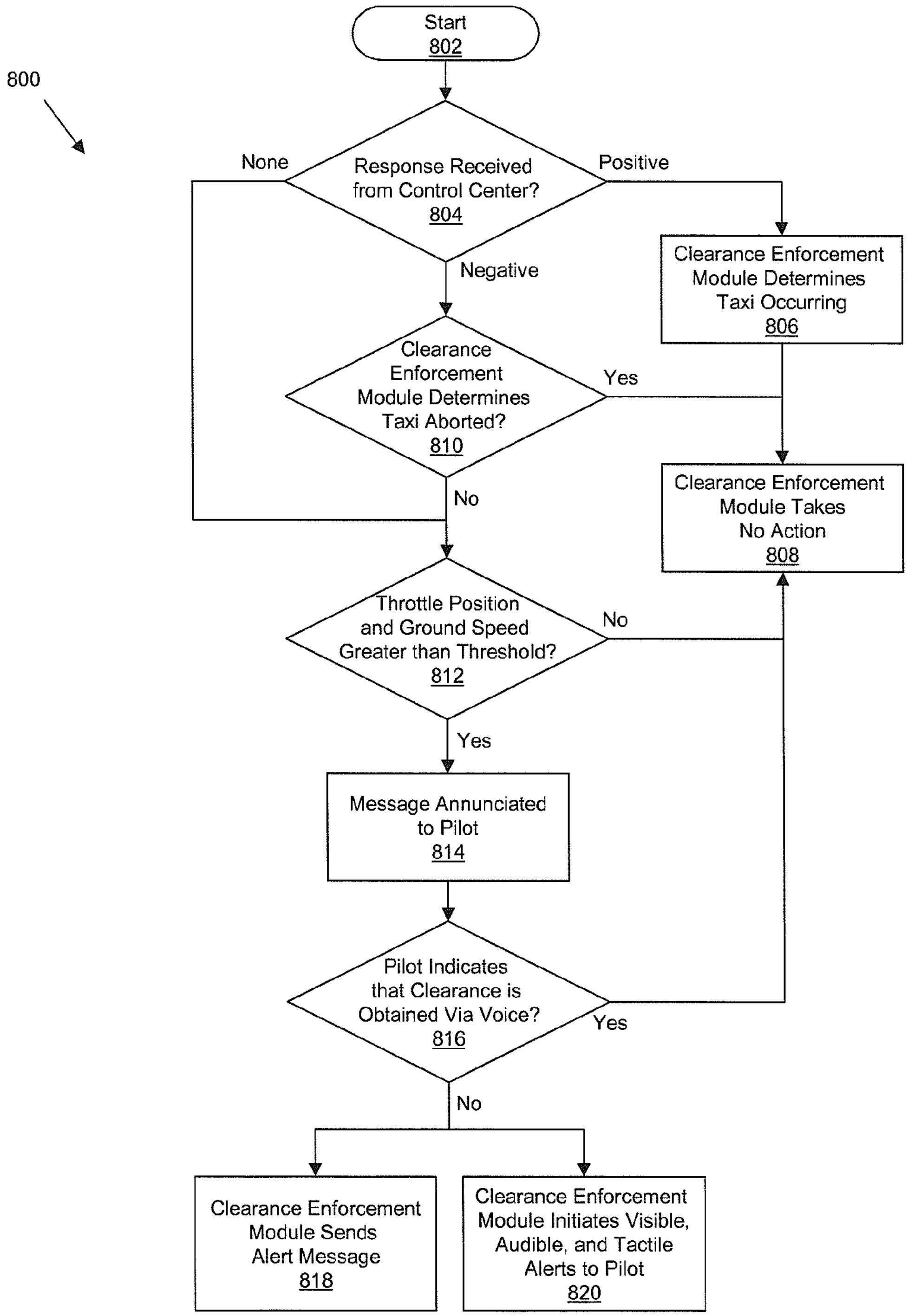
FIG. 8 is a flow chart showing another embodiment of a method of enforcing an aircraft clearance policy implemented using the system of FIG. 3.

FIG. 8 is a flow chart showing one embodiment of a method 800 of enforcing an aircraft clearance policy implemented using the system 100A of FIG. 3. The method 800 begins at block 802 when the aircraft 102 is on the ground and ready to taxi and the pilot initiates a taxi clearance request through the at least one input device 316 of the human-machine interface 114. A taxi clearance request message is sent to the control center 120 across the data link 124. The method 800 proceeds to block 804, where it is automatically determined what type of taxi response message, if any, has been received at the clearance enforcement module 118 of the CMU 302 from the control center 120. The clearance enforcement module 118 typically receives either an affirmative response to the taxi clearance request, a negative response to the taxi clearance request, or no response to the taxi clearance request back from the control center 120. If an affirmative response to the taxi clearance request has been received at block 804, the method 800 branches to block 806, where the clearance enforcement module 118 of the CMU 302 automatically determines that a taxi is occurring. The method 800 proceeds to block 808, where the clearance enforcement module 118 of the CMU 302 takes no action and the method 800 ends.

If the clearance enforcement module 118 of the CMU 302 automatically determines that a negative response to the taxi clearance request message has been received at block 804, the method 800 branches to block 810, where the clearance enforcement module 118 of the CMU 302 automatically determines whether the taxi has been aborted. If the clearance enforcement module 118 of the CMU 302 automatically determines that the taxi has been aborted at block 810, the method 800 branches to block 808, where the clearance enforcement module 118 of the CMU 302 takes no action and the method 800 ends.

If the clearance enforcement module 118 of the CMU 302 automatically determines that the taxi has not been aborted at block 810, the method 800 branches to block 812, where the clearance enforcement module 118 of the CMU 302 automatically determines whether the current throttle position 304 and the current ground speed 306 measured by the plurality of sensors and actuators 112 are greater than predetermined threshold values for throttle position and ground speed stored in the at least one storage medium 108 which indicate an imminent taxi. The predetermined threshold values for throttle position and ground speed which indicate an imminent taxi are defined as the lowest throttle positions and ground speeds indicative of an imminent taxi. As with the predetermined threshold values used in the method 400 and the method 500, the predetermined threshold values for taxi throttle positions and ground speeds which indicate an imminent taxi are typically stored in the at least one storage medium 108. If the clearance enforcement module 118 of the CMU 302 automatically determines that the current throttle position 304 and the current ground speed 306 are not greater than the predetermined threshold values for throttle position and ground speed indicating a taxi and stored in the at least one storage medium 108, the method 800 branches to block 808, where the clearance enforcement module 118 of the CMU 302 takes no action and the method 800 ends.

If the clearance enforcement module 118 of the CMU 302 automatically determines that the current throttle position 304 and the current ground speed 306 are greater than the predetermined threshold values for throttle position and ground speed indicating a taxi and stored in the at least one storage medium 108, the method 800 branches to block 814, where the clearance enforcement module 118 of the CMU 302 annunciates a message to the pilot and/or flight crew via the human-machine interface 114. Specifically, the clearance enforcement module 118 of the CMU 302 uses the at least one visible annunciator 310, the at least one audible annunciator 312, or the at least one tactile annunciator 314 to appraise the pilot/and or flight crew of the imminent taxi of the aircraft 102. Typically, the clearance enforcement module 118 of the CMU 302 uses more than one type of annunciator to increase the likelihood that the pilot and/or flight crew receive the annunciation.

The method 800 proceeds to block 816, where the clearance enforcement module 118 of the CMU 302 automatically determines whether the pilot and/or flight crew responded to the annunciation of block 814 indicating that the affirmative response to the taxi clearance request was obtained via voice communication. The pilot and/or flight crew typically input a response to the annunciation of block 814 using the at least one input device 316 of the human-machine interface 114. If the clearance enforcement module 118 of the CMU 302 automatically determines that the pilot and/or flight crew did respond to the annunciation of block 814 indicating that the affirmative response to the taxi clearance request was obtained via voice communication, then the method 800 branches to block 808 where the clearance enforcement module 118 takes no action.

If the clearance enforcement module 118 of the CMU 302 automatically determines that the pilot and/or flight crew did not respond to the annunciation of block 814 indicating that the affirmative response to taxi clearance request was obtained via voice communication, then the method 800 branches to block 818 and block 820 in parallel. At block 818, the clearance enforcement module 118 of the CMU 302 sends a message to the control center 120 via the data link 124, alerting the ATC of the imminent taxi without affirmative taxi clearance. At block 820, the clearance enforcement module 118 of the CMU 302 initiates visible, audible, and tactile alerts to the pilot and/or flight crew of the imminent taxi without affirmative taxi clearance using the at least one visible annunciator 310, the at least one audible annunciator 312, and the at least one tactile annunciator 314. Typically, the clearance enforcement module 118 initiates alerts using all three types of annunciators, but in some implementations, only one or two of the annunciator types are used. In other examples, one type of annunciator is first used, followed up with subsequent uses of other types of annunciators.

Returning to block 804, if it is automatically determined by the clearance enforcement module of the CMU 302 that no response to the taxi clearance request has been received at block 804, the method 800 branches to block 812, where the clearance enforcement module 118 of the CMU 302 automatically determines whether the current throttle position 304 and the current ground speed 306 measured by the plurality of sensors and actuators 112 are greater than predetermined threshold values for throttle position and ground speed stored in the at least one storage medium 108 which indicate an imminent taxi. As described above, the predetermined threshold values for taxi throttle positions and ground speeds that indicate an imminent taxi are typically stored in the at least one storage medium 108. The method 800 continues from block 812 as described above.

Figure 9:
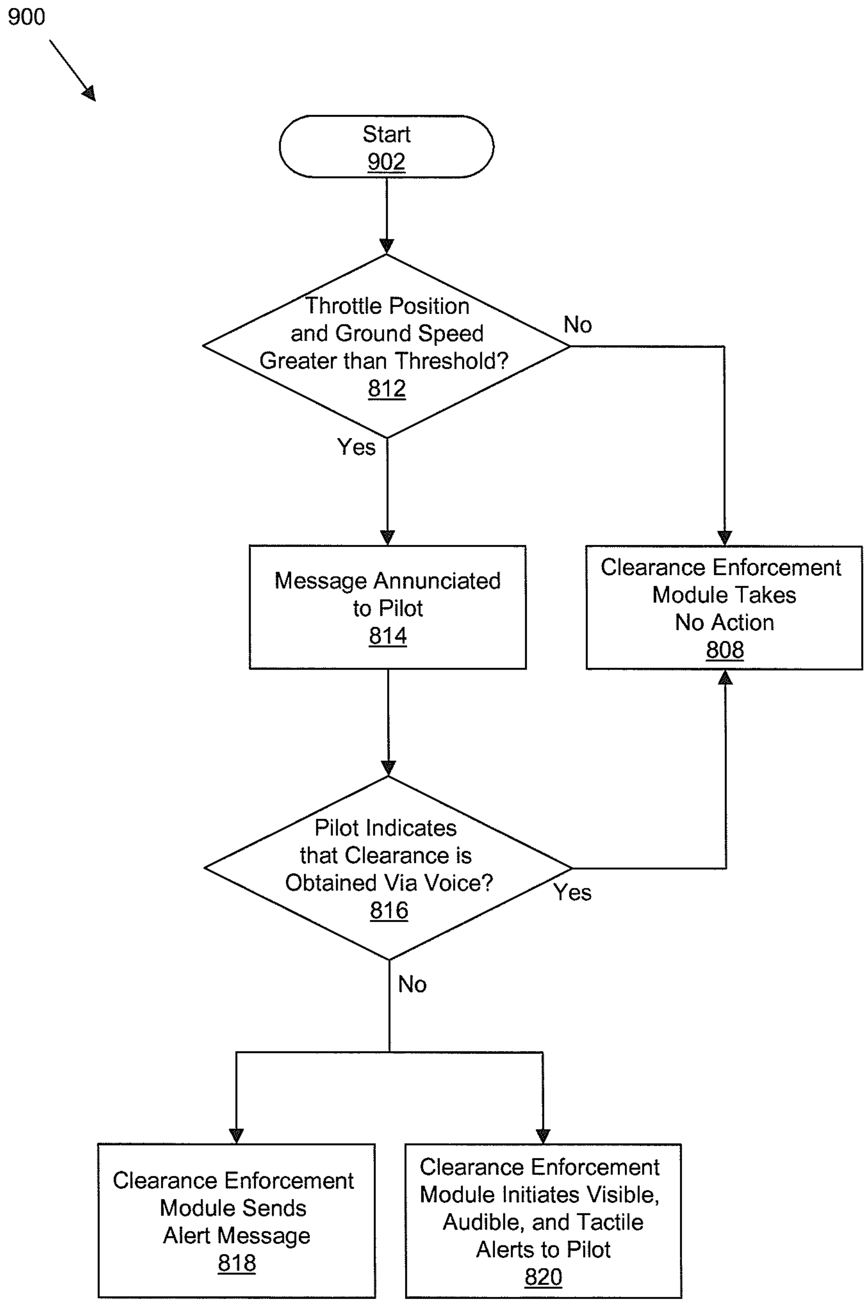
FIG. 9 is a flow chart showing another embodiment of a method of enforcing an aircraft clearance policy implemented using the system of FIG. 3.

FIG. 9 is a flow chart showing one embodiment of a method 900 of enforcing an aircraft clearance policy implemented using the system 100A of FIG. 3. The method 900 begins at block 902 when the aircraft 102 is on the ground and ready for taxi, the pilot forgot to request a taxi clearance, and the pilot initiates a taxi. The method 900 proceeds to block 812, where it follows the same flow from block 812 of the method 800 of FIG. 8 described above.

Figure 10:
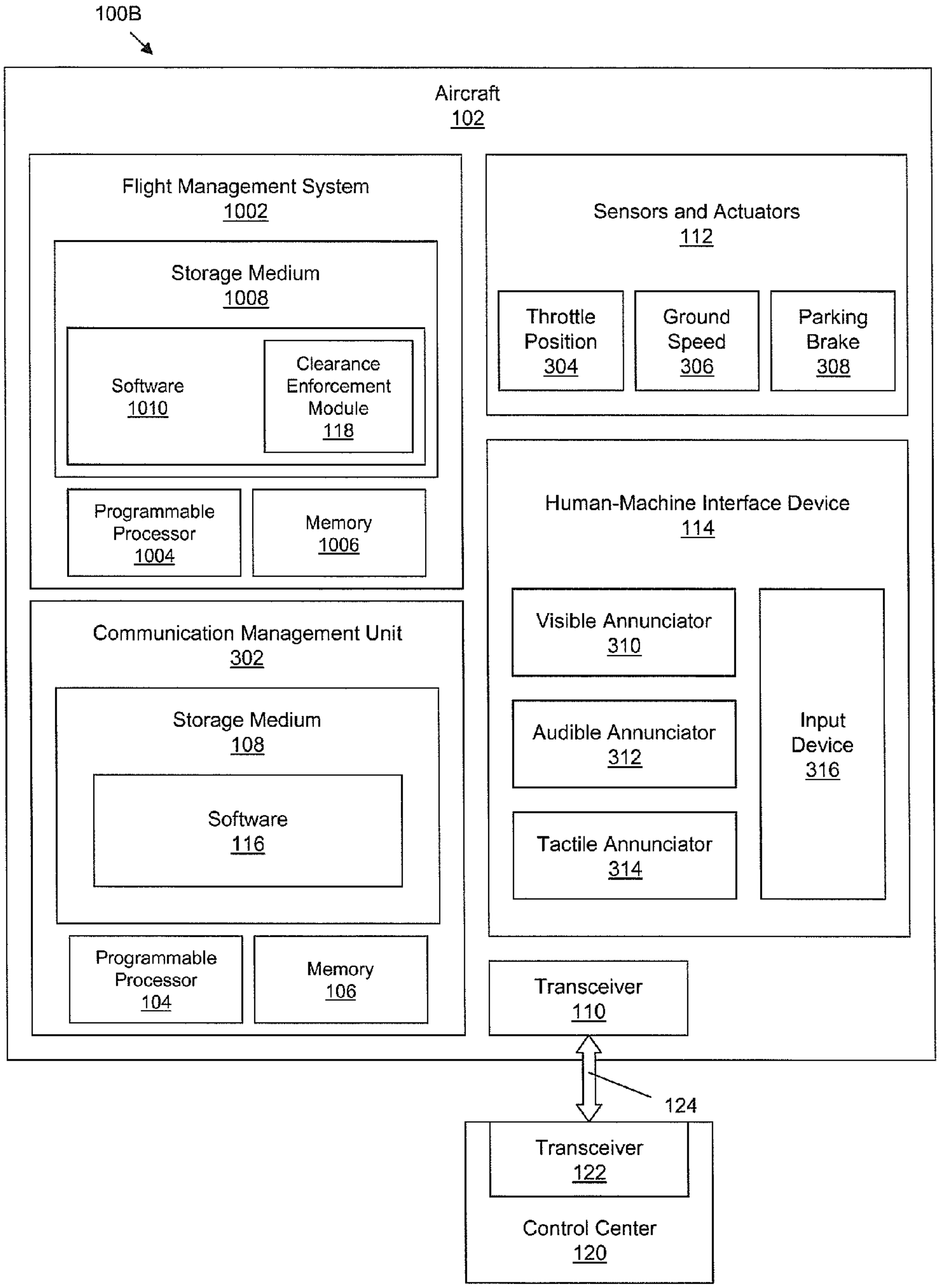
FIG. 10 is a block diagram of another specific implementation of the aircraft clearance enforcement system of FIG. 1 implemented using a flight management system.

FIG. 10 is a block diagram of another exemplary implementation of the aircraft clearance enforcement system 100 of FIG. 1 that is implemented using a flight management system. This implementation of the system is referenced in FIG. 10 using reference numeral 100B. Except as described below in connection with FIG. 10, those components of system 100B that are referenced in FIG. 10 using the same reference numerals as used in FIG. 1 or FIG. 3 are the same as the corresponding components described above in connection with FIG. 1 or FIG. 3, the description of which is not repeated here. The system 100B has generally the same components as the system 100A, but also includes a flight management system ("FMS") 1002 having at least one programmable processor 1004, at least one memory 1006, and at least one storage medium 1008. The at least one programmable processor 1004 of the FMS 1002 is configured similarly to the at least one programmable processor 104 of the CMU 302 in the system 100A described above. The at least one memory 1006 is configured similarly to the at least one memory 106 of the CMU 302 in the system 100A described above. The at least one storage medium 1008 is configured similarly to the at least one storage medium 108 of the CMU 302 in the system 100A described above. The primary difference between system 100B and system 100A is where the clearance enforcement module 118 is implemented. In the system 100B, the FMS 1002 hosts the clearance enforcement module 118 instead of the CMU 302, as in the system 100A. Software 1010 is stored on the at least one storage medium 1008 and the clearance enforcement module 118 discussed above is part of the software 1010.

In the system 100B, the CMU 302 acts as a router for data link messages sent and received between the FMS 1002 of the aircraft 102 and the control center 120. The CMU 302 routes messages to and from the clearance enforcement module 118. The system 100B can implement the method 400, the method 500, the method 600, the method 700, the method 800, and the method 900 similarly to system 100A, the only difference being that the clearance enforcement module 118 operates from the FMS 1002 instead of the CMU 302.

Figure 11:
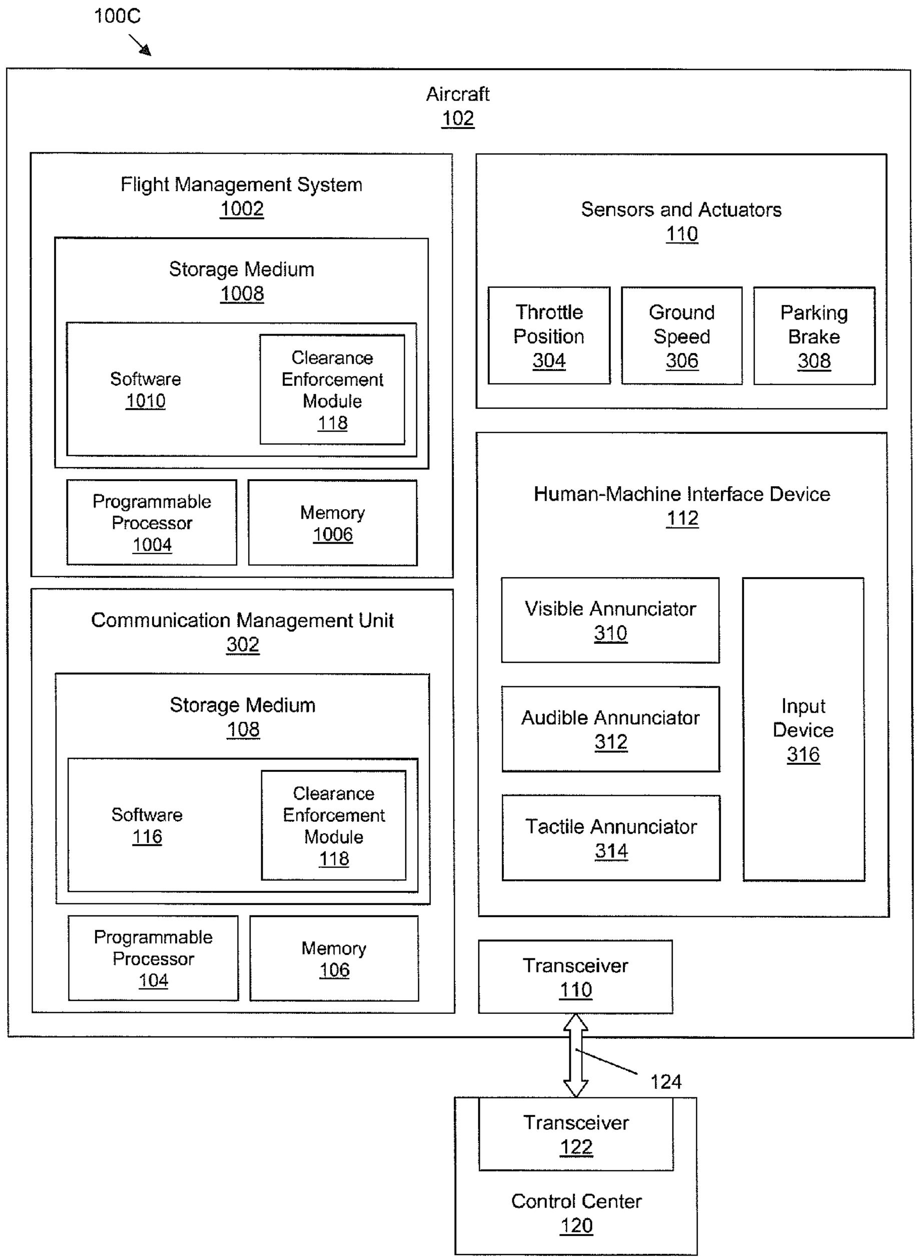
FIG. 11 is a block diagram of another specific implementation of the aircraft clearance enforcement system of FIG. 1 implemented using both a communication management unit and a flight management system.

FIG. 11 is a block diagram of another exemplary implementation of the aircraft clearance enforcement system 100 of FIG. 1 that is implemented using both the CMU 302 and the FMS 1002. This implementation of the system is referenced in FIG. 11 using reference numeral 100C. Except as described below in connection with FIG. 10, those components of system 100C that are referenced in FIG. 11 using the same reference numerals as used in FIG. 1, FIG. 3, or FIG. 10 are the same as the corresponding components described above in connection with FIG. 1 or FIG. 3, the description of which is not repeated here. The system 100C is a combination of the system 100A and the system 100B that implements a first instance of the clearance enforcement module 118 in the CMU 302 and a second instance of the clearance enforcement module 118 in the FMS 1002. As in the system 100A, the CMU 302 includes the at least one programmable processor 104, the at least one memory 106, and the at least one storage medium 108. In this embodiment, the first instance of the clearance enforcement module 118 is typically stored in the software 116 on the at least one storage medium 108 of the CMU 302. As in the system 100B, the FMS 1002 includes the at least one programmable processor 1004, the at least one memory 1006, and the at least one storage medium 1008. In this embodiment, the second instance of the clearance enforcement module 118 is typically stored in the software 1010 on the at least one storage medium 1008 of the FMS 1002. The second instance of the clearance enforcement module 118 operates similarly to the first instance of the clearance enforcement module 118 described above. The first instance of the clearance enforcement module 118 and the second instance of the clearance enforcement module 118 are in operative communication with each other such that each updates the other as to status and alert messages. The pilot and/or flight crew can initiate a clearance request using either the first instance of the clearance enforcement module 118 of the CMU 302 or the second instance of the clearance enforcement module 118 of the FMS 1002. Typically, the CMU 302 and the FMS 1002 are generally communicatively coupled with each other, such that there is a CMU/FMS communication channel configured for intersystem communication between the CMU 302 and the FMS 1002.

Figure 12:
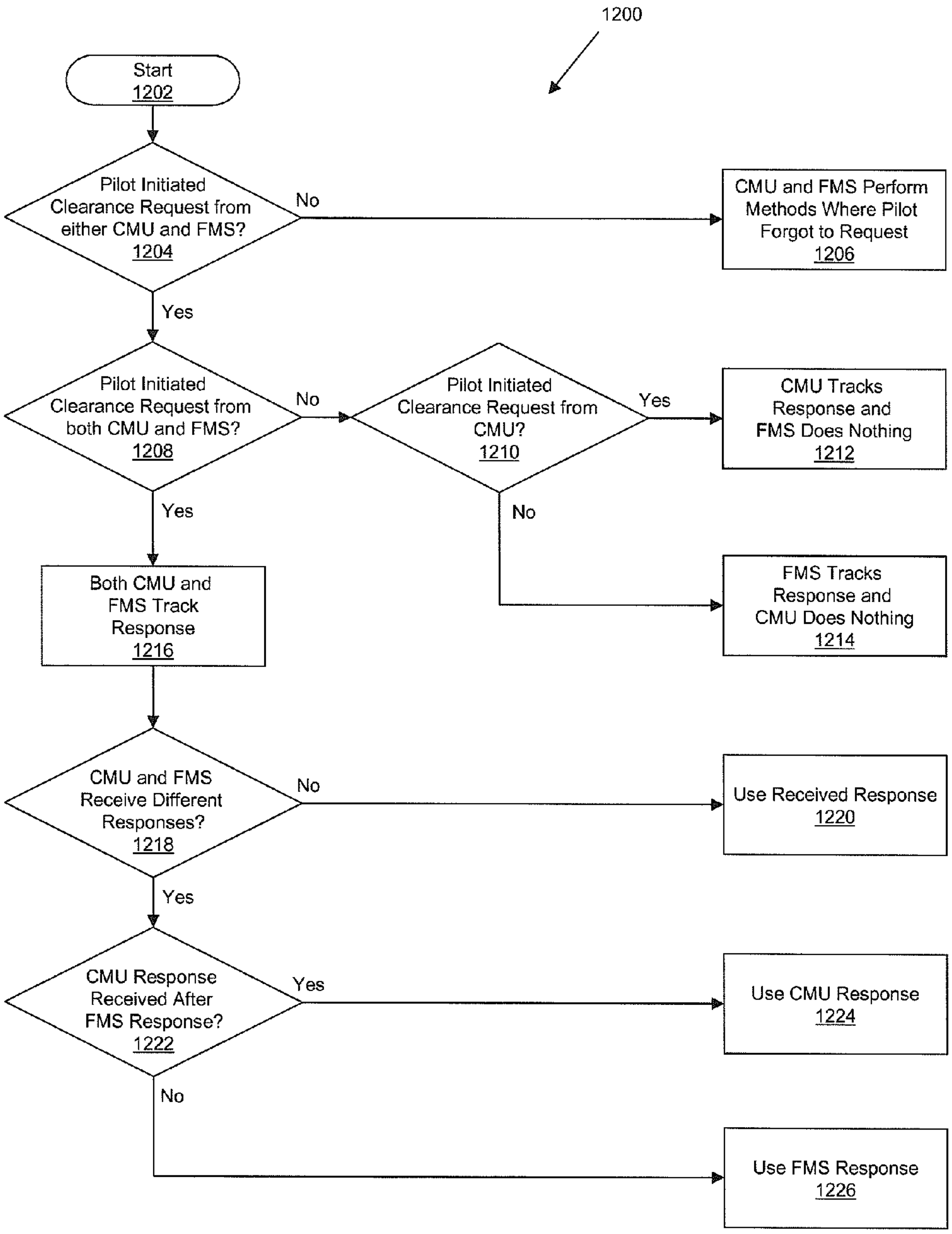
FIG. 12 is a flow chart showing one embodiment of a method for correlating enforcement of an aircraft clearance policy that is implemented using both a communication management unit and a flight management system.

FIG. 12 is a flow chart showing of one embodiment of a method 1200 for correlating enforcement of an aircraft clearance policy that is implemented in the system 100C of FIG. 11. In the embodiment shown in FIG. 12, the functionality of method 1200 is implemented by both the first instance of the clearance enforcement module 118 of the CMU 302 and the second instance of the clearance enforcement module 118 of the FMS 1002. The implementation of both the first instance of the clearance enforcement module 118 and the second instance of the clearance enforcement module 118 combined with the CMU/FMS communication channel between the CMU 302 and the FMS 1002 creates a fail-safe mechanism for clearance policy enforcement. The method 1200 starts at block 1202. The method 1200 continues to block 1204, where it is automatically determined whether the pilot and/or flight crew initiated a clearance request from either the CMU 302 or the FMS 1002. If it is automatically determined that the pilot did not initiate a clearance request from either the CMU 302 or the FMS 1002, then the method 1200 proceeds to block 1206, where both the first instance of the clearance enforcement module 118 in the CMU 302 and the second instance of the clearance enforcement module 118 in the FMS 1002 perform one of the method 500, the method 700, or the method 900.

If it is automatically determined that the pilot initiated a clearance request from either the CMU 302 or the FMS 1002 at block 1204, then the method 1200 proceeds to block 1208, where it is automatically determined whether the pilot initiated a clearance request from both the CMU 302 and the FMS 1002. If it is automatically determined that the pilot did not initiate a clearance request from both CMU 302 and the FMS 1002, then the method 1200 branches to block 1210, where it is automatically determined if the pilot initiated a clearance request from the CMU 302. If it is automatically determined that the pilot initiated the clearance request from the CMU 302 at block 1210, then the method 1200 branches to block 1212, where the first instance of the clearance enforcement module 118 in the CMU 302 tracks the responses and the second instance of the clearance enforcement module 118 in the FMS 1002 does nothing. The first instance of the clearance enforcement module 118 in the CMU 302 tracks the responses at block 1212 by going through one of the method 400, the method 600, or the method 800 described in this disclosure. The second instance of the clearance enforcement module 118 in the FMS 1002 does not go through any of the methods described in this disclosure.

If it is automatically determined that the pilot did not initiate a clearance request from the CMU 302 at block 1210, then the method 1200 branches to block 1214, where the second instance of the clearance enforcement module 118 in the FMS 1002 tracks the responses and the first instance of the clearance enforcement module 118 in the CMU 302 does nothing. The second instance of the clearance enforcement module 118 in the FMS 1002 tracks the responses at block 1214 by going through one of the method 400, the method 600, or the method 800 described in this disclosure. The first instance of the clearance enforcement module 118 in the CMU 302 does not go through any of the methods described in this disclosure.

If it is automatically determined that the pilot initiated a clearance request from both the CMU 302 and the FMS 1002 at block 1208, then the method 1200 branches to block 1216, where both the first instance of the clearance enforcement module 118 in the CMU 302 and the second instance of the clearance enforcement module 118 in the FMS 1002 track the responses using one of the method 400, the method 600, or the method 800 described in this disclosure. The method 1200 proceeds to block 1218, where it is automatically determined whether the first instance of the clearance enforcement module 118 in the CMU 302 and the second instance of the clearance enforcement module 118 in the FMS 1002 received different responses. If it is automatically determined that the first instance of the clearance enforcement module 118 in the CMU 302 and second instance of the clearance enforcement module 118 in the FMS 1002 did not receive different responses at block 1218, then the method 1200 branches to block 1220, where any response received from either the first instance of the clearance enforcement module 118 in the CMU 302 or the second instance of the clearance enforcement module 118 in the FMS 1002 is used. If both the first instance of the clearance enforcement module 118 in the CMU 302 and the second instance of the clearance enforcement module 118 in the FMS 1002 received responses at block 1220, they will necessarily be the same response and either can be used at block 1220. If only one of the first instance of the clearance enforcement module 118 in the CMU 302 or the second instance of the clearance enforcement module 118 in the FMS 1002 received a response at block 1220, then that received response is used. If neither received a response, then the method is followed accordingly.

If it is automatically determined that the first instance of the clearance enforcement module 118 in the CMU 302 and the second instance of the clearance enforcement module 118 in the FMS 1002 received different responses at block 1218, then the method 1200 branches to block 1222, where it is automatically determined whether the first instance of the clearance enforcement module 118 in the CMU 302 received its response after the second instance of the clearance enforcement module 118 in the FMS 1002 received its response. If the first instance of the clearance enforcement module 118 in the CMU 302 received its response after the second instance of the clearance enforcement module 118 in the FMS 1002 received its response, then the method 1200 branches to block 1224 and the response of the first instance of the clearance enforcement module 118 in the CMU 302 is used. If the first instance of the clearance enforcement module 118 in the CMU 302 did not receive its response after the second instance of the clearance enforcement module 118 in the FMS 1002 received its response, then the method 1200 branches to block 1226 and the response of the second instance of the clearance enforcement module 118 in the FMS 1002 is used. Thus, if the first instance of the clearance enforcement module 118 in the CMU 302 receives an affirmative response to its clearance request and the second instance of the clearance enforcement module 118 in the FMS 1002 receives a negative response to its clearance request or if the second instance of the clearance enforcement module 118 in the FMS 1002 receives an affirmative response to its clearance request and the first instance of the clearance enforcement module 118 in the CMU 302 receives a negative response to its clearance request, then the decision will be based on which ever response was sent later from the ATC stationed at the control center 120.

Although the systems and methods described above demonstrate clearance policy enforcement occurring in clearance enforcement modules onboard the aircraft 102, in other embodiments, the policy enforcement occurs outside the aircraft 102. For example, the policy enforcement could occur on a clearance enforcement module similar to the clearance enforcement module 118 described above and implemented at the control center 120. In this example, the values from the plurality of sensors and actuators 112 are sent across the data link to the control center 120 and processed by the clearance enforcement module implemented at the control center 120.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of enforcing a vehicle clearance policy specifying that a vehicle must receive an affirmative clearance response message to a clearance request message from a control center external to the vehicle before executing a restricted ground movement associated with the affirmative clearance response message to the clearance request message, the method comprising:

detecting at least one of current physical movement of the vehicle or at least one indication of imminent movement of the vehicle using data from at least one sensor or actuator;

determining within a management unit of the vehicle whether the vehicle is initiating the restricted ground movement associated with the affirmative clearance response message to the clearance request message based on the detection of at least one of current physical movement of the vehicle or at least one indication of imminent movement of the vehicle;

determining within the management unit of the vehicle whether the affirmative clearance response message to the clearance request message has been received from the control center external to the vehicle;

automatically determining within the management unit of the vehicle when the vehicle begins initiating the restricted ground movement associated with the affirmative clearance response message to the clearance request message without first having received the affirmative clearance response message to the clearance request message and while the vehicle does not have any outstanding unexecuted clearances to perform any restricted ground movements, wherein the vehicle is stationary immediately before beginning initiating the restricted ground movement, wherein the restricted ground movement comprises at least one of initiating a pushback, initiating a taxi, and initiating a takeoff; and automatically alerting an operator of the vehicle that the vehicle is initiating the restricted ground movement associated with the affirmative clearance response message to the clearance request message without first having received the affirmative clearance response message to the clearance request message and while the vehicle does not have any outstanding unexecuted clearance to perform any restricted ground movements.

2. The method of claim 1, wherein determining within the management unit of the vehicle whether the vehicle is initiating the restricted ground movement based on the detection of the at least one of current physical movement of the vehicle or at least one indication of imminent movement of the vehicle comprises at least one of:

determining when a current throttle position of the vehicle exceeds a threshold vehicle throttle position;

determining when a current speed of the vehicle exceeds a threshold vehicle speed; and determining when a parking brake is disengaged.

3. The method of claim 1, wherein:

if the clearance request message is sent to the control center;

if the affirmative clearance response message to the clearance request message is received from the control center; and if the vehicle executes the restricted ground movement associated with the affirmative clearance response message to the clearance request message after the affirmative clearance response message to the clearance request message is received from the control center, then no alert message indicating that the vehicle is initiating the restricted ground movement without having received the affirmative clearance response message to the clearance request message from the control center is automatically sent from the vehicle to the control center.

4. The method of claim 1, wherein:

if a clearance request message is not sent to the control center;

if the vehicle executes the restricted ground movement associated with the affirmative clearance response message to the clearance request message before the affirmative clearance response message to the clearance request message is received from the control center; and if a clearance is not obtained via voice communication before the affirmative clearance response message to the clearance request message is received from the control center, then an alert message indicating that the vehicle is initiating the restricted ground movement without having received the affirmative clearance response message to the clearance request message from the control center is automatically sent from the vehicle to the control center.

5. The method of claim 1, wherein:

if the clearance request message is sent to the control center;

if the affirmative clearance response message to the clearance request message is not received from the control center; and if the vehicle executes the restricted ground movement associated with the affirmative clearance response message to the clearance request message before the affirmative clearance response message to the clearance request message is received from the control center, then an alert message indicating that the vehicle is initiating the restricted ground movement without having received the affirmative clearance response message to the clearance request message from the control center is automatically sent from the vehicle to the control center.

6. The method of claim 1, wherein:

if the clearance request message is sent to the control center;

if a negative clearance response message to the clearance request message is received from the control center; and if the vehicle executes the restricted ground movement associated with the affirmative clearance response message to the clearance request message before the affirmative clearance response message to the clearance request message is received from the control center, then the alert message indicating that the vehicle is initiating the restricted ground movement without having received the affirmative clearance response message to the clearance request message from the control center is automatically sent from the vehicle to the control center.

7. The method of claim 1, further comprising automatically sending an alert message from the vehicle to the control center indicating that the vehicle is initiating the restricted ground movement associated with the affirmative clearance response message to the clearance request message without having received the affirmative clearance response message to the clearance request message from the control center.

8. The method of claim 1, wherein the automatically alerting the operator of the vehicle that the vehicle is initiating the restricted ground movement associated with the affirmative clearance response message to the clearance request message without first having received the affirmative clearance response message to the clearance request message comprises at least one of:

automatically visually alerting the operator of the vehicle that the vehicle is initiating the restricted ground movement associated with the affirmative clearance response message to the clearance request message without having received the affirmative clearance response message to the clearance request message;

automatically audibly alerting the operator of the vehicle that the vehicle is initiating the restricted ground movement associated with the affirmative clearance response message to the clearance request message without having received the affirmative clearance response message to the clearance request message; and automatically tactilely alerting the operator of the vehicle that the vehicle is initiating the restricted ground movement associated with the affirmative clearance response message to the clearance request message without having received the affirmative clearance response message to the clearance request message.

9. The method of claim 1, wherein:

the control center comprises an air traffic control center.

10. The method of claim 1, wherein the vehicle comprises at least one of an aircraft, a sea ship, a spacecraft, and a ground vehicle.

11. The method of claim 1, wherein:

a clearance response message to the clearance request message comprises at least one of a specific field, a specific flag, and a specific element; and the at least one of a specific field, a specific flag, and a specific element of the clearance response message to the clearance request message is used to determine whether the clearance response message to the clearance request message is one of an affirmative clearance response message and a negative clearance response message.

12. The method of claim 1, wherein determining within the management unit of the vehicle whether the affirmative clearance response message to the clearance request message has been received from the control center external to the vehicle comprises:

determining whether the affirmative clearance response message to the clearance request message is obtained via voice communication.

13. A clearance enforcement system for a vehicle comprising:

a transceiver to communicate over a data link that communicatively couples the vehicle to a control center external to the vehicle;

at least one sensor or actuator configured to provide input for detecting at least one of current physical movement of the vehicle or at least one indication of imminent movement of the vehicle;

a management unit configured to enforce a vehicle clearance policy specifying that a vehicle must receive an affirmative clearance response message to a clearance request message from a control center external to the vehicle before executing a restricted ground movement associated with the affirmative clearance response message to the clearance request message by doing at least the following:

determining whether the vehicle is initiating the restricted ground movement associated with the affirmative clearance response message to the clearance request message based on the detection of at least one of current physical movement of the vehicle or at least one indication of imminent movement of the vehicle;

determining whether the affirmative clearance response message to the clearance request message has been received from the control center external to the vehicle;

automatically determining within the vehicle when the vehicle begins initiating the restricted ground movement associated with the affirmative clearance response message to the clearance request message without first having received the affirmative clearance response message to the clearance request message and while the vehicle does not have any outstanding unexecuted clearances to perform any restricted ground movements, wherein the vehicle is stationary immediately before beginning initiating the restricted ground movement, wherein the restricted ground movement comprises at least one of initiating a pushback, initiating a taxi, and initiating a takeoff; and automatically alerting the operator of the vehicle that the vehicle is initiating the restricted ground movement associated with the affirmative clearance response message to the clearance request message without first having received the affirmative clearance response message to the clearance request message and while the vehicle does not have any outstanding unexecuted clearance to perform any restricted ground movements by at least one of:

an audible annunciator;

a visible annunciator; and a tactile annunciator.

14. The clearance enforcement system of claim 13, wherein the management unit is at least one of:

a Communication Management Unit; and a Flight Management System.

15. The clearance enforcement system of claim 13, wherein whether the vehicle is initiating the restricted ground movement associated with the affirmative clearance response message to the clearance request message based on the detection of at least one of current physical movement of the vehicle or at least one indication of imminent movement of the vehicle comprises at least one of:

determining when a current throttle position of the vehicle exceeds a threshold vehicle throttle position;

determining when a current speed of the vehicle exceeds a threshold vehicle speed; and determining when the parking brake is disengaged.

16. The clearance enforcement system of claim 13, wherein the management unit is a Communication Management Unit, the clearance enforcement system further comprising an interface to couple the Communication Management Unit to a Flight Management System, wherein the Communication Management Unit receives data from the Flight Management System that is used in automatically determining when the vehicle is initiating the restricted ground movement without having received the affirmative clearance response message to the clearance request message.

17. The clearance enforcement system of claim 13, wherein determining whether the affirmative clearance response message to the clearance request message has been received from the control center external to the vehicle comprises:

determining whether the affirmative clearance response message to the clearance request message is obtained via voice communication.

18. The clearance enforcement system of claim 13, wherein the vehicle comprises at least one of an aircraft, a sea ship, a spacecraft, and a ground vehicle.

19. A non-transitory program-product for enforcing a vehicle clearance policy specifying that a vehicle must receive an affirmative clearance response message to a clearance request message from a control center external to the vehicle before executing a restricted ground movement associated with the affirmative clearance response message to the clearance request message, the program-product comprising a processor-readable storage medium on which program instructions are embodied, wherein the program instructions are operable to, when executed by at least one programmable processor included in the vehicle that is configured to communicate with the control center, cause the vehicle to:

detect at least one of current physical movement of the vehicle or at least one indication of imminent movement of the vehicle using data from at least one sensor or actuator;

determine within a management unit of the vehicle whether the vehicle is initiating the restricted ground movement associated with the affirmative clearance response message to the clearance request message based on the detection of at least one of current physical movement of the vehicle or at least one indication of imminent movement of the vehicle;

determine within the management unit of the vehicle whether the affirmative clearance response message to the clearance request message has been received from the control center external to the vehicle;

automatically determine within the management unit of the vehicle when the vehicle begins initiating the restricted ground movement associated with the affirmative clearance response message to the clearance request message without first having received the affirmative clearance response message to the clearance request message and while the vehicle does not have any outstanding unexecuted clearances to perform any restricted ground movements, wherein the vehicle is stationary immediately before beginning initiating the restricted ground movement, wherein the restricted ground movement comprises at least one of initiating a pushback, initiating a taxi, and initiating a takeoff; and automatically alert an operator of the vehicle that the vehicle is initiating the restricted ground movement associated with the affirmative clearance response message to the clearance request message without having received the affirmative clearance response message to the clearance request message and while the vehicle does not have any outstanding unexecuted clearance to perform any restricted ground movements by doing at least one of:

automatically visually alert the operator of the vehicle, using a visible annunciator, that the vehicle is initiating the restricted ground movement associated with the affirmative clearance response message to the clearance request message without having received the affirmative clearance response message to the clearance request message;

automatically audibly alert the operator of the vehicle, using an audible annunciator, that the vehicle is initiating the restricted ground movement associated with the affirmative clearance response message to the clearance request message without having received the affirmative clearance response message to the clearance request message; and automatically tactilely alert the operator of the vehicle, using a tactile annunciator, that the vehicle is initiating the restricted ground movement associated with the affirmative clearance response message to the clearance request message without having received the affirmative clearance response message to the clearance request message.

20. The program-product of claim 19, wherein the program instructions are operable to, when executed by the at least one programmable processor, cause the vehicle to automatically determine within the management unit of the vehicle whether the vehicle is initiating the restricted ground movement based on the detection of the at least one of current physical movement of the vehicle or at least one indication of imminent movement of the vehicle by doing at least one of:

determining when a current throttle position of the vehicle exceeds a threshold vehicle throttle position;

determining when a current speed of the vehicle exceeds a threshold vehicle speed; and determining when the parking brake is disengaged.

21. The program-product of claim 19, wherein the program instructions are further operable to, when executed by the at least one programmable processor, cause the vehicle to automatically send an alert message from the vehicle to the control center indicating that the vehicle is initiating the restricted ground movement associated with the affirmative clearance response message to the clearance request message without having received the affirmative clearance response message to the clearance request message from the control center.

22. The program-product of claim 19, wherein the program instructions are further operable to, when executed by the at least one programmable processor, cause the vehicle to determine within the management unit of the vehicle whether the affirmative clearance response message to the clearance request message has been received from the control center external to the vehicle by:

determining whether the affirmative clearance response message to the clearance request message is obtained via voice communication.

* * * * *